July 9, 1968            A. HARTAI            3,392,402

RECORDER WITH OPTICAL FEEDBACK SERVO SYSTEM

Filed Feb. 11, 1966

INVENTOR.
ANTAL HARTAI
BY
*Charles A. Weigel, Jr.*

United States Patent Office 3,392,402
Patented July 9, 1968

3,392,402
RECORDER WITH OPTICAL FEEDBACK
SERVO SYSTEM
Antal Hartai, Littleton, Mass., assignor to Hewlett-Packard Company, a corporation of California
Filed Feb. 11, 1966, Ser. No. 526,888
14 Claims. (Cl. 346—31)

ABSTRACT OF THE DISCLOSURE

There is described a servo system having an optical feedback for accurately positioning the stylus of a recorder in accordance with an input signal. To obtain the optical feedback, a photo-potentiometer is employed in the stylus drive system. Light is piped through the length of the stylus itself and directed onto the surface of the photo-potentiometer. In addition, a light through the stylus is piped to the stylus tip to impinge upon the chart paper. The stylus itself is mounted on the underside of the chart paper to facilitate its removal and replacement.

This invention relates to a servo positioner and, more particularly, to a recorder of greatly simplified design having a relatively high speed of response and high degree of accuracy.

Servo positioning systems find many applications in modern day technology. They are used to position a machine tool, to vary the flight path of an airplane, or to set a valve, to name but a few. One particular application of servo positioning systems has been in the field of recorders where it is desired to produce a visual trace representing the variations in amplitude of an input signal as a function of time. In these systems it is necessary to position a stylus over a record medium. The visible trace may be formed by any one of many known methods including ink, electric marking, pressure modulation of a pressure sensitive paper, or heat fixing of a chemically-treated paper.

Many of these recording systems position the stylus using a galvanometer usually of D'Arsonval construction, to convert the electrical input signal to a proportional shaft rotation. Other known systems use a two-phase servomotor. Whatever the system and whatever the application employed, there are many sources of errors which prevent the accurate positioning of an object in accordance with an input signal. Among these sources of error in the typical case of a recorder are non-linearities existing in the galvanometer itself, or the twisting, bending, or vibrating of the stylus when accelerated rapidly.

Negative position feedback is generally employed to reduce the magnitude of such errors. A transducer, such as a slidewire, senses the position of the object or moving part and generates an electrical signal linearly related to its physical displacement. Typically, the transducer is excited by a constant reference voltage and the transducer's output signal compared with the input signal. Any difference between the two signals, the error signal, is employed to drive a servomotor which repositions the moving part or stylus to accurately follow the variations of the input signal. To obtain the greatest accuracy from position feedback, the actual position of the stylus itself must be sensed. Unfortunately, this has the disadvantage of not only adding mass to the stylus but also imposing friction in the drive system with the result that speed and accuracy of response is sacrificed. Additionally, if a wire wound or slidewire resistance element is employed for the transducer, the sliding contact itself tends to wear out and reduce the operational life of the system.

It is, therefore, an object of this invention to obviate many of the disadvantages of the prior art servo position feedback systems.

Customarily, most recorders whether of the circular, strip chart, or X–Y type provide a trace of the same side of the chart paper from which the trace is viewed. This arrangement causes many problems. In galvanometer type recorders the galvanometer itself is particularly susceptible to damage and, being exposed to the viewer, such damage often occurs. Additionally, with the stylus and its drive servo system being in front of the chart paper, it is somewhat difficult to replace the rolls or sheets of chart paper.

It is, therefore, an object of this invention to accurately and rapidly position the stylus of a recorder in accordance with an input signal.

Another object of this invention is to provide an improved servo system having an optical position feedback means.

In a preferred embodiment of the invention a servo drive system having an optical feedback arrangement is provided for accurately positioning the stylus of a recorder in accordance with the amplitude and polarity of an input signal. Light is piped through the length of the stylus itself and directed not only to the stylus tip or nib but also onto the surface of a photopotentiometer. That portion of the light piped to the stylus nib is directed through the nib to impinge upon the reverse side of the chart paper. This permits the stylus itself and its servo drive system to be positioned on the back or underneath side of the chart paper where it is relatively protected from inadvertent damage. The chart paper itself may be readily removed and replaced with little or no danger of damage to the delicate stylus.

By energizing each end of the resistive element of the phototentiometer with equal but opposite polarity voltages and simultaneously varying these voltages in accordance with the input signal, there is provided a virtual null or point of reference potential at a point along the length of the resistive element that varies its position in accordance with the input signal. The error signal at the tap of the photo-potentiometer varies in accordance with the relative positions of the light spot impinging on the photo-potentiometer and the virtual null point. The stylus servo drive repositions the stylus until the light again impinges on the virtual null point of the photo-potentiometer. Since the stylus itself does not contact the photo-potentiometer, friction is reduced considerably thereby permitting a relatively accurate and rapid stylus response to input signal variations.

The novel features that are considered characteristic of this invention are set forth with particularity in the appended claims. The invention, itself, however, both as to its organization and method of operation, as well as additional objects and advantages thereof, will best be understood from the following description when read in connection with the accompanying drawings, in which:

Figure 1:
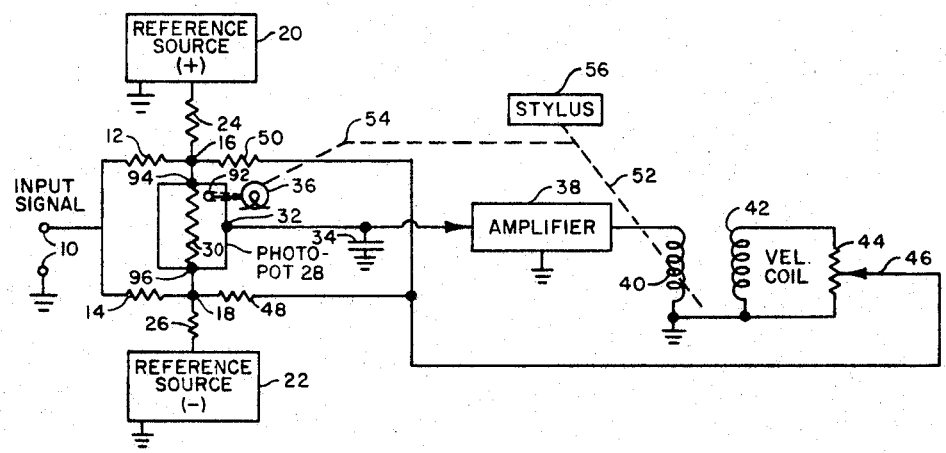
FIGURE 1 is a partial block and partial schematic diagram illustrating a recorder system constructed in accordance with a preferred embodiment of this invention.

In the drawing of FIG. 1 there is shown a servo positioning system using an optical position feedback arrangement constructed in accordance with a preferred embodiment of this invention. The system shown has particular application in a recorder as will become evident. An input signal, either alternating or direct current, to be recorded is applied to a pair of input terminals 10, one being connected to a point of reference potential or system ground. The input signal is coupled simultaneously through a first pair of summing resistors 12 and 14, respectively, to respective summing junctions 16 and 18, respectively. At the summing junctions 16 and 18, the input signal is added to voltage signals of equal but opposite polarities derived from respective positive and negative reference sources 20 and 22. The reference sources may be any suitable power supply of a well-known design capable of providing accurately controlled voltages. Zener diode regulated supplies of conventional design are quite suitable for this purpose. The respective reference sources 20 and 22 are connected to the respective summing junctions 16 and 18 through a second pair of summing resistors 24 and 26, respectively.

The impedance element of a radiation controlled potentiometer, often referred to as a photo-potentiometer 28, is connected between the two summing junctions 16 and 18 by a direct connection from the respective summing junctions to the end terminals 94 and 96, on either end of the impedance element, shown here by way of illustration as a resistor 30. The photo-potentiometer 28 has a variable pick-off or tap denoted here by the terminal 32. The electrical connection of the output terminal 32 to a particular physical point along the length of the resistive element 30 is determined by the position of the impingement of radiation on a selectively limited zone of the photopotentiometer itself as denoted by the small circular area 92. In this instance this light spot 92 is moved along the length of the photo-potentiometer 28 by moving a radiation source denoted by the lamp 36 along the length of the element 30.

The photo-potentiometer 28 may be any suitable photo responsive element of a type known today. One type of such element that is suitable for this application inasmuch as it has a particularly linear resistance-length or displacement characteristic is that described in an application Ser. No. 429,499 filed Feb. 1, 1965, for Robert L. Waer. The photo-potentiometer described by Waer comprises a substrate having a resistor film proportioning element and a conductive film output terminal (terminal 32 of FIG. 2) placed thereon in adjacent strips continuously spaced a finite distance apart. Conductive film input terminals (94, 96 in FIGS. 1 and 2) contacting each end of this resistive film proportioning element are also placed on the substrate. A wire wound resistor is collinearly attached to the resistive film proportioning element and forms therewith the proportioning member of the potentiometer. This proportioning member is coupled to the adjacent output terminal 32 along the full length thereof by a photoconductive element which is activated by optical means such as the movable light beam from the source 36 producing the illuminated spot 92.

The output terminal 32 is coupled through a filtering capacitor 34 to ground and also is directly connected to a high gain amplifier 38 of conventional design. The output of amplifier 38 is connected to a driving coil 40 of a suitable actuating means herein illustrated as a galvanometer. The galvanometer drive system may be of any conventional type such as that described, for example, in U.S. Patent 3,088,788 issued May 7, 1963, to A. D. Brown, Jr., et al. In such system there may also be provided a velocity coil 42 whose function is to provide a signal proportional to the speed and direction of movement of the galvanometer. A potentiometer 44 is connected across the velocity coil 32. The variable tap 46 of the potentiometer 44 is coupled back through a third pair of adding resistors 48 and 50 to the respective summing junctions 16 and 18. The winding direction of the velocity coil 42 is effected such that the velocity signal polarity opposes that of the input signal. The voltage signal containing velocity information thus is combined with the input signal and the reference voltages derived from the reference sources 20 and 22.

In this manner the voltage applied across the photo-potentiometer 28 is such as to produce at a point along the resistive element 30 a virtual null or point of reference potential which point varies in position along the element 30 in accordance with (1) the amplitude and polarity of the input signal, (2) the amplitude and polarity of the velocity feedback signal, and (3) the amplitude of the voltages derived from the reference sources 20 and 22. The driving coil 40 repositions a stylus 56 which is coupled to the galvanometer by the linkage 52, and the light source 36, which is coupled to the galvanometer by the linkage 54, to seek the null point on the resistive element 30. The function then of the servo system is to follow this virtual null with respect to system ground and to reposition the stylus in whatever direction or distance is necessary such that the light spot 92 again impinges upon this point of null voltage. The system is thus a null seeking system.

Figure 2:
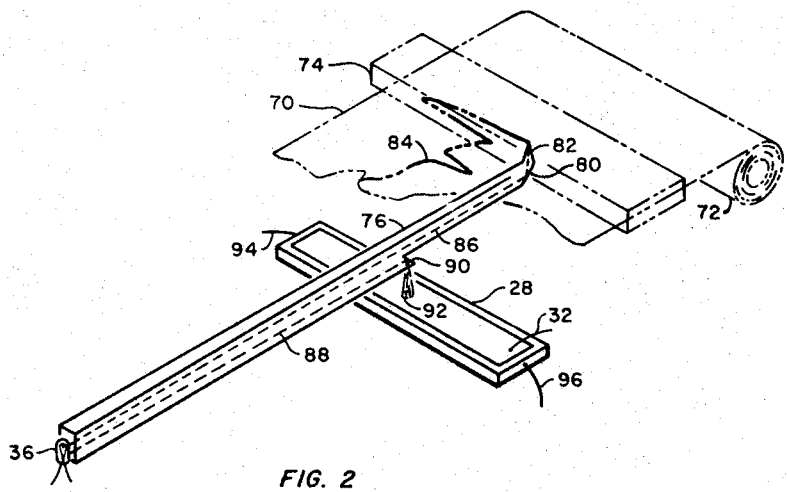
FIGURE 2 is a partial perspective view of a stylus assembly that may be employed in the system shown in FIG. 1.

The novel manner in which the light source 36 is mounted on the stylus itself may be more clearly seen with reference to FIG. 2 in which the light source itself is illustrated by the lamp 36. The light source 36 is positioned at one end of a light guide 76 which may be no more than a molded rod or bar of transparent material such as poly methyl-methacrylate usually known as "Plexiglas." The guide 76 may be coated with a highly reflective material. For example a mirror surface may be formed by known techniques or other reflective substances such as white paint, etc., may be used.

This light guide 76 is preferably enclosed within a suitable metal strut stylus boom for strength, denoted by the linkage 52, although not shown in FIG. 2 for the sake of clarity. This stylus boom preferably is constructed of very light metal such as lithium-magnesium alloy. The end of the guide 76 adjacent the light source 36 is ground and polished perpendicularly to the axis of the guide 76 to permit light denoted by the dashed lines 86, 86 to be transmitted through the guide 76 from source 36. At the end of the light guide 76 remote from the light source 36, a rounded, truncated cone-shaped sapphire nib 82 is cemented in position on the side of the guide 76 adjacent the chart paper 70. The end 80 of the light guide 76 adjacent the stylus nib 82 is ground to have a flat polished surface lying at a 45° angle with respect to the axis of the guide 76, so as to permit light, denoted by the dashed line 86, from the source 36 to be reflected upwardly in the drawing through the nib 82 to impinge upon the lower or underneath side of a strip of chart paper or other suitable recording medium 70 which is supplied by a roll 72. The light spot is visible to the observer from the upper side of the recording medium 70 if a translucent recording medium is used. Most chart papers available today are suitable for this purpose. The nib 82 presses the paper 70 against a transparent platen 74 which may include an electrically conductive heating element for use when pressure or heat sensitive papers which respond to the additional heat are employed for the chart paper 70. The pressure of the nib 82 against the chart paper 70 produces, in the event pressure sensitive paper is employed, a trace 84. For this purpose pressure sensitive paper having the pressure sensitive coating on both sides of the paper is preferable.

The lower edge of the light guide 76 is somewhat shorter than the upper edge and its end point is formed and polished in what may be described as an inverted 45° angle so as to reflect light transmitted along the lower path 88 from the source 36 downwardly in the drawing to impinge at 92 upon the photoconductive element of the photo-potentiometer 28. In this figure there is shown the end terminals 94 and 96 of the photo-potentiometer 28 which are connected in FIG. 1 with the summing junctions 16 and 18, respectively, and also the output terminal 32 which is connected to amplifier 38 (FIG. 1).

It may be seen from this arrangement that not only the galvanometer boom but all of the writing implements as well as the servo system are all located beneath (the side away from the viewer) the chart paper 70. This greatly facilitates the removal and replacement of the chart paper merely by the removal of the platen 74 or feeding the paper between the platen 74 and the nib 82 and serves to protect the galvanometer itself from inadvertently being struck. This permits the entire galvanometer servo system to be constructed as an integral unit which may be removed and replaced as such with great facility. The take-off point 90 for the light spot 92 is located relatively close to the nib 82 such that the position information is as representative as possible of the actual position of the nib 82.

In the operation of the system illustrated in FIGS. 1 and 2, an input signal applied across the ipnut terminals 10 is added at the summing junctions 16, 18 to the respective positive and negative reference voltages provided by the sources 20 and 22, respectively. In the event of no input signal, the point of virtual null is located approximately at the center of the photo-potentiometer 28. Depending upon the amplitude of the input signal and its polarity relative to system ground, the point of virtual null is shifted along the resistive element 30. Any shift is immediately detected by a voltage appearing at the output terminal 32 causing the drive coil 40 to reposition the stylus 56 and light source 36 to the new null point at which time the system again comes to rest.

During the shifting process, the information from the velocity coil 42 relating to the speed of movement of the stylus 56 is combined with the input signal 10 and functions generally to reduce the effect of the input signal so as to reduce overshoot and hunting of the servo system in seeking the null point. The use of the optical feedback has the particular advantage of reducing drag imposed upon the galvanometer by conventional position sensors to a negligible value. This enhances the speed and accuracy of the response of the servo system to input signal variations and also reduces wear and tear on the system due to the frictional contact of parts as occurs in slidewire systems. Also because of the reduced frictional load, lower driving forces may be employed to achieve the same results.

Figure 3:
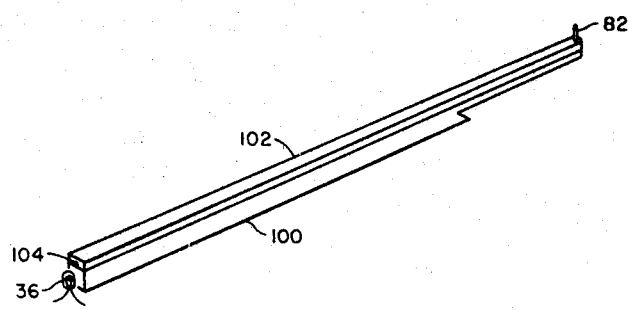
FIGURE 3 is a partial perspective view of an alternative embodiment of a stylus that may be employed in the system of FIG. 1.

In FIG. 3 there is shown an alternative embodiment of the invention in which ink may be supplied to a pen nib in the stylus by simply forming the light guide 76 of two pieces of clear plastic material of the type described hereinbefore. The upper piece 102 is formed to have an axial groove 104 thereon which, when placed against the lower piece 100, provides a capillary-sized conduit through which ink may be supplied to a pen nib 82 which could be made of transparent sapphire. In this manner a small lit circle could be seen on the paper due to the light through the light guide.

There has thus been described a relatively simple, low cost yet highly precise, accurate recording system having a relatively high speed of response. The particular recording system described facilitates integral design and the easy removal of the chart paper for replacement purposes.

What is claimed is:

1. A servo system for accurately positioning an object in accordance with the amplitude and polarity relative to a point of reference potential of an electrical input signal comprising:
   a lineal radiation controlled impedance element having a tap whose effective position along the length of said element varies in accordance with the selective irradiation of a limited zone of said element,
   means responsive to said input signal for establishing across said impedance element an electric voltage gradient that encompasses said point of reference potential thereby to provide a virtual point of reference potential on said element,
   radiation means for irradiating selectively a limited zone of said impedance element thereby to provide an output signal at said tap that varies as a function of the linear position of said zone, and
   actuating means coupled to said tap and responsive to the amplitude and polarity of the output signal at said tap for repositioning said object and said impedance element relative to each other to reduce the amplitude of said output signal substantially to zero.

2. The system set forth in claim 1 in which said radiation means is positioned on said object thereby to denote the position of said object.

3. The system set forth in claim 1 which also includes:
   first and second sources of potential each providing opposite polarity signals relative to said point of reference potential, and
   a pair of summing circuit means for adding said input signal to each of said source signals, said impedance element being connected between said pair of summing circuit means.

4. The system set for forth in claim 3 in which said actuating means comprises:
   a galvanometer having a drive coil means adapted to position said object and a velocity coil for providing a velocity signal having an amplitude proportional to the velocity of the movement of said object and a polarity related to the direction of movement of said object, and
   a second pair of summing circuit means each including means coupled to said velocity coil for adding said velocity signal to one of said source signals and to said input signal, thereby to vary the position of said virtual point of reference potential along said impedance element in accordance with the velocity of motion of said object.

5. The system set forth in claim 1 which also includes:
   first and second sources of potential each providing opposite polarity signals relative to said point of reference potential,
   a galvanometer having a drive coil means adapted to position said object and a velocity coil for providing a velocity signal having an amplitude proportional to the velocity of movement of said object and a polarity related to the direction of movement of said object,
   summing circuit means for adding said input signal and a velocity signal to each of said source signals, thereby to vary the position of said virtual point of reference potential along said impedance element in accordance with the velocity of motion of said object.

6. The system set forth in claim 1 wherein said object is a recorder stylus having a boom,
   a nib on one end of said boom,
   a light guide supported along its length by said boom, and,
   said radiation means positioned at one end of said light guide remote from said nib, said light guide having means for directing at least a portion of radiation from said radiation means onto the limited zone of said impedance element, thereby to compare the actual to the desired position of said stylus as represented by said virtual point of reference potential.

7. The system set forth in claim 6 in which said recorder includes a recording medium cooperating with said stylus nib, thereby to make a permanent trace on said medium of the movements of said stylus nib relative to said medium.

8. The system set forth in claim 7 wherein said stylus is located on the back side of said recording medium, and said light guide includes means for directing a portion of said radiation in said light guide to the back side of said recording medium, said recording medium being translucent whereby a lighted area is visible on the front side of said medium denoting the position of said stylus.

9. The system set forth in claim 8 wherein said means for directing radiation to the back side of said recording medium includes a shaped transparent nib in contact with said light guide thereby to transmit a discrete beam of light to said recording medium.

10. A recorder having a stylus adapted to be positioned across a recording medium in accordance with the amplitude and polarity relative to a point of reference potential of an input signal to be recorded, said stylus comprising:
   a lighted guide,
   a nib positioned on one end of said guide and contacting said medium,
   radiation means for irradiating the other end of said light guide remote from said nib, and
   means including said light guide for directing at least a portion of said irradiation onto the back side of said recording medium, said recording medium being translucent whereby a lighted area is visible on the front side of said medium thereby to denote the position of said stylus, 11. The recorder set forth in claim 10 in which said means for directing irradiation onto the back side of said recording medium includes a transparent nib in contact with said light guide thereby transmitting a discrete area of light to said recording medium.

12. The recorder set forth in claim 10 which includes:
   a lineal radiation controlled impedance element having a tap whose effective position along the length of said element varies in accordance with the selective irradiation of a limited zone of said element,
   means responsive to said input signal for establishing across said impedance element an electric voltage gradient that encompasses said point of reference potential, thereby to provide a virtual point of reference potential on said element,
   means including said light guide for directing at least a portion of said irradiation onto the limited zone of said impedance element, thereby to compare the actual position of said stylus as represented by the limited irradiation zone to the desired position of said stylus as represented by the position of said virtual point of reference potential, and
   actuating means coupled to said tap and responsive to the amplitude and polarity of the output signal at said tap for repositioning said stylus and said impedance element relative to each other to reduce the amplitude of said output signal substantially to zero.

13. The recorder set forth in claim 12 wherein said light guide has a capillary sized longitudinal conduit adapted to supply ink to said nib thereby to produce a permanent trace on the reverse side of said recording medium.

14. The recorder set forth in claim 13 wherein said light guide comprises two longitudinal sections having mating surfaces, one of said surfaces having a longitudinal groove therein to provide said conduit for ink.

References Cited
UNITED STATES PATENTS

| | | | |
|---|---|---|---|
| 1,597,487 | 8/1926 | St. Clair | 346—108 |
| 3,321,766 | 5/1967 | Everest | 346—32 |
| 3,340,536 | 9/1967 | Sauber | 346—32 |

RICHARD B. WILKINSON, *Primary Examiner.*

JOSEPH W. HARTARY, *Assistant Examiner.*